United States Patent [19]

Guetens

[11] 3,927,115
[45] Dec. 16, 1975

[54] PRODUCTION OF HYDROPEROXIDES
[75] Inventor: Edward G. Guetens, Glendora, N.J.
[73] Assignee: Atlantic Richfield Company, Los Angeles, Calif.
[22] Filed: Dec. 26, 1973
[21] Appl. No.: 427,596

Related U.S. Application Data
[63] Continuation-in-part of Ser. No. 124,973, March 16, 1971, Pat. No. 3,741,907.

[52] U.S. Cl. ...... 260/610 B; 260/632 C; 260/586 C
[51] Int. Cl.$^2$ ................ C07C 179/02; C07C 31/13; C07C 45/16
[58] Field of Search ........ 260/610 B, 610 A, 586 C, 260/632 C

[56] References Cited
UNITED STATES PATENTS

| | | | |
|---|---|---|---|
| 2,430,864 | 11/1947 | Farka et al. | 260/610 B |
| 2,497,349 | 2/1950 | Farkas et al. | 260/610 B |
| 2,609,395 | 9/1952 | Doughrty et al. | 260/610 B |
| 2,851,496 | 9/1958 | Cates et al. | 260/610 B |
| 2,852,565 | 9/1958 | Nozaki | 260/609 |
| 2,897,239 | 7/1959 | Rovelli | 260/610 B |

FOREIGN PATENTS OR APPLICATIONS
700,546 12/1953 United Kingdom ............ 260/610 B Primary Examiner—James O. Thomas, Jr.
Assistant Examiner—W. B. Lone
Attorney, Agent, or Firm—John C. Martin, Jr.

[57] ABSTRACT

Method for the production of hydroperoxides of hydrocarbons having no aliphatic or cycloaliphatic tertiary carbon atoms wherein such hydrocarbons are oxidized in the liquid phase with molecular oxygen in the presence of a hydrocarbon having a tertiary carbon atom. This method gives high hydroperoxide selectivities at high conversion levels and at high conversion rates.

10 Claims, No Drawings

PRODUCTION OF HYDROPEROXIDES

CROSS REFERENCE TO RELATED APPLICATIONS

This application is a continuation-in-part application of application Ser. No. 124,973, filed Mar. 16, 1971, now U.S. Pat. No. 3,741,907 entitled PRODUCTION OF HYDROPEROXIDES

BACKGROUND OF THE INVENTION

1. Field of the Invention

This invention relates to the production of hydroperoxides of hydrocarbons having no aliphatic or cycloaliphatic tertiary carbon atoms and more particularly it relates to the production of the hydroperoxides by oxidation of such hydrocarbons in the liquid phase with molecular oxygen as the oxidizing agent.

2. Prior Art

It is well-known from the published technical and patent literature that the oxidation of hydrocarbons having tertiary carbon atoms such as isobutane, cumene, p-cymene, and the like to the corresponding hydroperoxide using molecular oxygen is commercially feasible. High selectivities at high conversions and conversion rates are readily obtainable.

The oxidation of hydrocarbons which do not have a tertiary carbon atoms such as cyclohexane, ethylbenzene and the like to the corresponding hydroperoxide using molecular oxygen is known but only at very low conversions and conversion rates is it possible to obtain a reasonably high selectivity for the hydroperoxides, i.e. about 50 percent.

These findings are explained by the fact that the tertiary carbon-hydrogen bond is the weakest bond in the compounds containing a tertiary carbon and accordingly, this bond is attacked readily in the oxidation reaction giving a high rate of conversion and producing a tertiary hydroperoxide which is quite stable. This permits the reaction to be carried out to a high conversion level of the hydrocarbon while at the same time the selectivity to the hydroperoxide is very good. Only small amounts of acidic and high boiling residue is produced. This is not true for the oxidation of hydrocarbons having no aliphatic or cycloaliphatic tertiary carbon atoms, e.g. those having aliphatic or cycloaliphatic secondary carbon-hydrogen bonds. The rate of conversion is much slower because of the increased bond strength of the secondary carbon-hydrogen bond and the oxidation must be carried out at low conversion of the hydrocarbon to obtain high yields of the hydroperoxide, which moreover, is considerably less stable than the tertiary hydroperoxides. If it is attempted to carry out the oxidation at high conversions large amounts of high boiling residues are produced since competing side reactions occur.

The literature shows, for example, that the total conversion in the oxidation of cyclohexane cannot be above about 1.5–2 percent if a 50 percent yield of the hydroperoxide is desired. At a 4 percent conversion the maximum yield of the hydroperoxide is only about 30 percent. Heretofore, various proposals have been made to circumvent these disadvantages, for example, aluminum reactors, low rates of conversion, low total conversion of hydrocarbon alone or concurrently with the removal of by-product acids. Although these proposals have indicated that acceptable yields of hydroperoxide can be obtained by their use, none are economically or commercially feasible.

It now has been found that these hydrocarbons which do not have an aliphatic or cycloaliphatic tertiary carbon atom can be oxidized readily to high hydroperoxide selectivities at high conversion levels of the hydrocarbon together with high rates of conversion if the oxidation is carried out in the presence of a hydrocarbon having a tertiary carbon atom. These surprising and unexpected improvements are not shown or suggested in any of the known prior art relating to hydroperoxide production resulting from the oxidation with molecular oxygen of hydrocarbons having no aliphatic or cycloaliphatic tertiary carbon atoms.

SUMMARY OF THE INVENTION

In accordance with this invention hydrocarbons having no aliphatic or cycloaliphatic tertiary carbon atoms such as the cycloalkanes and alkyl substituted aromatics are oxidized with molecular oxygen in the presence of a hydrocarbon having a tertiary carbon atom to produce the corresponding hydroperoxide of the hydrocarbon. Temperatures in the range of 80°C. to 180°C. and pressures in the range of from atmospheric to 500 psig can be employed. Reactions may be carried out either continuously or batchwise, however, in all cases good mixing, i.e. contact, should be employed.

It is an object of this invention therefore, to provide an improved method for the production of hydroperoxides of hydrocarbons having no aliphatic or cycloaliphatic tertiary carbon atoms in the molecule.

It is another object of this invention to provide a method for the production of hydroperoxides of hydrocarbons having no aliphatic or cycloaliphatic tertiary carbon atoms using molecular oxygen, wherein high hydroperoxide selectivities are obtained at high conversion levels and high rates of conversion.

It is another object of this invention to provide a method for the production of hydroperoxides of hydrocarbons having no aliphatic or cycloaliphatic tertiary carbon atoms using molecular oxygen in the presence of a hydrocarbon having a tertiary carbon atom in the molecule.

Other objects of this invention will be apparent from the following description of the preferred embodiments and from the claims.

DESCRIPTION OF THE PREFERRED EMBODIMENTS

The hydrocarbons which are oxidized to give the desired hydroperoxides in accordance with the method of this invention are those having aliphatic primary and secondary carbon atoms and no aliphatic tertiary carbon atoms and those having only cycloaliphatic secondary carbon atoms and no cycloaliphatic tertiary carbon atoms. Examples of the first group are alkyl-substituted benzenes such as ethylbenzene, n-propylbenzene, n-butylbenzene, diethylbenzene, di-n-propylbenzene and the like. Aromatic ring carbons are neither aliphatic nor cycloaliphatic and they cannot be oxidized in the manner of either secondary or tertiary aliphatic or cycloaliphatic carbons. Examples having only secondary cycloaliphatic carbon atoms are the cycloalkanes, e.g., cyclopentane, cyclohexane, cycloheptane, cyclooctane, and the like. In general, the invention has its greatest utility for the production of the hydroperoxides of hydrocarbons having from 5 to 12 carbon atoms in the molecule.

The molecular oxygen may be either in the pure form or it may be admixed with the one or more inert gases, for example $N_2$ and can be in the form of air, the important factor being that the pressure employed provides a sufficiently high concentration of oxygen in the reaction zone to give the desired reaction.

The teritary carbon atom-containing hydrocarbons which can be employed in the process of this invention are those having at least one aliphatic or cycloaliphatic tertiary carbon atom and having from 4 to 12 carbon atoms in the molecule. The aliphatic hydrocarbons are exemplified by the branched chain alkanes such as isobutane, isopentane, isohexane, 3-methylbutane, 3-methylpentane, 3-ethylpentane, and the like, including the branched chain heptanes, octanes, nonanes, decanes, and undecanes. The cycloaliphatic hydrocarbons include, for example alkyl-substituted cycloalkanes such as methylcyclopentane, ethylcyclopentane, methylcyclohexane, ethylcyclohexane, the dimethylcyclohexanes, methylcyclooctane and the like. Other hydrocarbons include those having an aromatic ring with an alkyl side chain containing a tertiary carbon atom (alkyl-substituted aromatics), for example, cumene and p-cymene.

In general, it is preferred to employ the lower molecular weight compounds, for example, those having from 4 to 6 carbon atoms in the molecule since they and their oxidation products are more readily separable from the desired hydroperoxides of the hydrocarbons having no aliphatic or cycloaliphatic teritary carbon atoms. The most preferred hydrocarbon is isobutane.

Reaction temperatures in the range from 80°C. to 180°C. are suitable, with from about 130°C. to 170°C. being preferred and 145°C. to 165°C. being the most preferred.

Pressures in the range of from atomspheric to 300 psi. can be employed, although pressures from about 100 to 250 psi. are completely satisfactory. Practically, the total pressure should be high enough to insure liquid phase at reaction temperature with the oxygen partial pressure being high enough to insure that sufficient oxygen is dissolved in the reaction mixture to provide the necessary reaction.

Mole ratios of the hydrocarbon having an aliphatic or cycloaliphatic tertiary carbon atom to the hydrocarbon not having such tertiary atoms may be varied over a rather wide range. It is preferred, however, to operate at a mole ratio of hydrocarbon having the tertiary carbon atom to the hydrocarbon not having the tertiary carbon atom in the range of from 1:0.5 to 1:15 with the more preferable range being from 1:1 to 1:10. By carrying out the reaction using these mole ratios optimum realization of the objectives of this invention is obtained.

In general, the hydrocarbon conversion level of the hydrocarbon not having the tertiary carbon atom should not exceed about 20 mole percent and preferably should range from about 4 to 15 mole percent, the most preferred range is from 8 to 12 percent. Under these conditions a yield of about 50 mole percent of the hydrocarbon hydroperoxide in the product is obtained which is the desired objective although obviously a selectivity as high as possible commensurate with the conversion level and rate of conversion is most desirable.

It will be understood that the conversion of the hydrocarbon having the tertiary carbon atom will be considerably greater, because of its greater ease of oxidation. Such conversion may well be complete, i.e. 100 mole percent, although the amount of such conversion is not subject to the limitations applicable to the hydrocarbon not having the tertiary carbon atom. The hydrocarbon having the tertiary hydrocarbon will, of course, be oxidized to its corresponding hydroperoxide and alcohol with some small amounts of other oxidation products.

It is an important feature of this invention that the entire oxidation including the products from the hydrocarbon not having the tertiary carbon atoms as well as those from the hydrocarbon having the tertiary carbon atoms need not be separated but are useful for example, as the oxidation agent in the well-known reaction for the epoxidation of olefins in the presence of a molybdenum-containing catalyst. The hydroperoxides in the oxidate are of course the oxidizing agents, however, the presence of the other oxidation products do not deleteriously effect the usefulness of the total oxidate as the oxidation agent. If desired, the oxidation products can be separated by methods well-known to the art, particularly when the hydrocarbon having the tertiary carbon atom is of considerably lower molecular weight than the hydrocarbon not having the tertiary carbon atom.

The reaction should be carried out in the substantial absence of metal ions which would catalyze the decomposition of the hydroperoxides and thus, interfere with the attainment of the objectives of this invention. These are, in particular, the heavy metal ions and are well-known to the art as catalysts for the decomposition of organic hydroperoxides.

The comparative examples which follow are provided to illustrate the invention in further detail.

EXAMPLE 1

The following two reactions were carried out in a one liter autoclave at a temperature of 150°C. at a pressure of 500 p.s.i.g. and in the presence of 0.5 weight percent of tertiary butyl hydroperoxide initiator. The reactions were carried out for 230 minutes and air was used as the source of molecular oxygen. In the first run, the feed was pure cyclohexane and a conversion of 10.6% was achieved. In a second run, a feed consisting of 60% cyclohexane and 40% isobutane was introduced. In this run, the cyclohexane conversion was calculated to be 12.7 percent, showing an increased conversion of about 20% compared to the first run.

This comparative example shows that the oxidation with molecular oxygen of a hydrocarbon-containing secondary carbon atom but no tertiary carbon atoms can be materially improved by carrying out the reaction in the presence of a hydrocarbon containing a tertiary carbon atom. The oxidate products (comprising cyclohexyl hydroperoxide, cyclohexanol, and cyclohexanone) from the process of this invention can be used as an oxidant for an olefin such as propylene or may be used as a process for preparing an alcohol such as in the example in this case, cyclohexanol by first decomposing the hydroperoxide values in the oxidation mixture and then distilling to separate the secondary and tertiary alcohols from each other.

Various modifications should become apparent to those skilled in the art without departing from the spirit and scope of the invention.

I claim:

1. A method for preparing cyclohexyl hydroperoxide comprising contacting cyclohexane in the liquid phase with molecular oxygen at a temperature in the range of from 80°C. to 180°C. in the presence of a branched chain alkane hydrocarbon having a tertiary carbon atom and containing from 4 to 6 carbon atoms.

2. The method according to claim 1 wherein said hydrocarbon having a tertiary carbon atom is selected from the group consisting of isobutane, 2,3-dimethylbutane, and isopentane.

3. The method according to claim 1 wherein said hydrocarbon having a tertiary carbon atom is isobutane, and the mole ratio of said isobutane to said cyclohexane is in the range of 1:0.5 to 1:15 and the conversion of said cyclohexane is not in excess of about 20 mole percent based on the amount of said cyclohexane charged.

4. The method according to claim 3 wherein said mole ratio is in the range of 1:1 to 1:10, the reaction temperature is in the range of from 145°C to 165°C, and the conversion of said cyclohexane is in the range of from about 4 to 15 mole percent based on the amount of said cyclohexane charged.

5. A method for the oxidation of cyclohexane to produce a mixture of oxidation products comprising cyclohexyl hydroperoxide, cyclohexanol, and cyclohexanone comprising contacting said cyclohexane in the liquid phase with molecular oxygen at a temperature in the range of from 80°C. to 180°C. in the presence of a hydrocarbon selected from the group consisting of isobutane, 2,3-dimethylbutane and isopentane.

6. The method of claim 5 wherein said cyclohexyl hydroperoxide is subsequently decomposed to cyclohexanol.

7. The method of claim 6 wherein cyclohexanol is recovered from the reaction mixture.

8. The method according to claim 5 wherein said hydrocarbon is isobutane, and the mole ratio of said isobutane to said cyclohexane is in the range of from 1:0.5 to 1:15.

9. The method according to claim 8 wherein said mole ratio is in the range of 1:1 to 1:10.

10. The method according to claim 5 wherein the conversion of said cyclohexane is not in excess of about 20 mole percent based on the amount of said cyclohexane charged.

* * * * *